US009344239B2

(12) United States Patent
Sun et al.

(10) Patent No.: US 9,344,239 B2
(45) Date of Patent: May 17, 2016

(54) ALLOCATING ORTHOGONAL FREQUENCY-DIVISION MULTIPLE ACCESS (OFDMA) RESOURCES IN ETHERNET PASSIVE OPTICAL NETWORK(PON) OVER COAXIAL (EPOC)

(71) Applicant: Futurewei Technologies, Inc., Plano, TX (US)

(72) Inventors: Fanglin Sun, Santa Clara, CA (US); Dao Pan, Santa Clara, CA (US); Li Zhang, Wuhan (CN); Jim Chen, Corona, CA (US)

(73) Assignee: Futurewei Technologies, Inc., Plano, TX (US)

( * ) Notice: Subject to any disclaimer, the term of this patent is extended or adjusted under 35 U.S.C. 154(b) by 94 days.

(21) Appl. No.: 14/258,419

(22) Filed: Apr. 22, 2014

(65) Prior Publication Data

US 2014/0314418 A1    Oct. 23, 2014

Related U.S. Application Data

(60) Provisional application No. 61/814,714, filed on Apr. 22, 2013, provisional application No. 61/817,534, filed on Apr. 30, 2013.

(51) Int. Cl.
*H04B 10/00* (2013.01)
*H04L 5/00* (2006.01)
(Continued)

(52) U.S. Cl.
CPC .............. *H04L 5/0044* (2013.01); *H04B 10/27* (2013.01); *H04J 14/00* (2013.01); *H04L 5/0064* (2013.01);
(Continued)

(58) Field of Classification Search
CPC . H04L 5/0044; H04L 27/2697; H04L 5/0064; H04L 12/2801; H04Q 11/0067; H04B 10/27; H04B 3/00; H04J 14/00; H04J 2203/0089
See application file for complete search history.

(56) References Cited

U.S. PATENT DOCUMENTS 8,085,802 B1 * 12/2011 Monk ................... H04L 5/0046
370/419
8,498,294 B1 * 7/2013 Monk ................. H04L 12/2801
370/392

(Continued)

OTHER PUBLICATIONS

Foreign Communication From a Counterpart Application, PCT Application No. PCT/US2014/034989, International Search Report dated Aug. 4, 2014, 5 pages.

(Continued)

*Primary Examiner* — Danny Leung
(74) *Attorney, Agent, or Firm* — Conley Rose, P.C.; Grant Rodolph; Brandt D. Howell (57) ABSTRACT

A method implemented in a Fiber Coaxial Unit (FCU) comprising receiving a plurality of Ethernet Passive Optical Network (EPON) report messages from a plurality of Coaxial Network Units (CNUs) across a coaxial network, receiving an EPON gate message comprising Time Quanta (TQ) information indicating an upstream transmission time grant for the FCU across the optical network, translating the TQ based upstream transmission time grants to OFDM resource block grants in a time domain and in a frequency domain across the coaxial network for each CNU based on the configurable constants, and transmitting an EPON over Coaxial (EPoC) gate message to each CNU, wherein each EPoC gate message comprises a CNU profile indicating the Orthogonal Frequency-Division Multiplexing (OFDM) resource block grants for the an associated CNU and a start time.

17 Claims, 7 Drawing Sheets

(51) Int. Cl.

| | |
|---|---|
| H04B 10/27 | (2013.01) |
| H04J 14/00 | (2006.01) |
| H04Q 11/00 | (2006.01) |
| H04L 27/26 | (2006.01) |
| H04L 12/28 | (2006.01) |
| H04B 3/00 | (2006.01) |

(52) U.S. Cl.
CPC ........ *H04L 27/2697* (2013.01); *H04Q 11/0067* (2013.01); *H04B 3/00* (2013.01); *H04J 2203/0089* (2013.01); *H04L 12/2801* (2013.01)

(56) References Cited

U.S. PATENT DOCUMENTS

| | | | | |
|---|---|---|---|---|
| 2005/0025145 A1* | 2/2005 | Rakib | ................... | H04J 3/0682 370/389 |
| 2005/0114904 A1* | 5/2005 | Monk | ................. | H04L 12/2801 725/118 |
| 2007/0254608 A1* | 11/2007 | Bougard | ............. | H04B 7/0689 455/103 |
| 2009/0047957 A1* | 2/2009 | Westerberg | ........... | H04W 36/14 455/436 |
| 2009/0092196 A1* | 4/2009 | Okunev | ................ | H04L 27/206 375/260 |
| 2009/0129788 A1* | 5/2009 | Seimetz | ................. | H04B 10/60 398/208 |
| 2009/0196262 A1* | 8/2009 | Chin | ..................... | H04L 5/0007 370/336 |
| 2009/0196602 A1* | 8/2009 | Saunders | ........... | H04B 10/5053 398/26 |
| 2010/0157920 A1* | 6/2010 | Choi | ................... | H04L 12/2801 370/329 |
| 2010/0158036 A1* | 6/2010 | Choi | ..................... | H04L 1/0083 370/442 |
| 2012/0087664 A1* | 4/2012 | Zhang | ................. | H04J 14/0298 398/66 |
| 2012/0257892 A1* | 10/2012 | Boyd | ................. | H04Q 11/0067 398/58 |
| 2013/0004155 A1* | 1/2013 | Liang | ................. | H04Q 11/0067 398/9 |
| 2013/0004179 A1* | 1/2013 | Nielsen | .................... | H04B 3/50 398/115 |
| 2014/0314418 A1* | 10/2014 | Sun | ........................ | H04B 10/27 398/89 |

OTHER PUBLICATIONS

Foreign Communication From a Counterpart Application, PCT Application No. PCT/US2014/034989, Written Opinion dated Aug. 4, 2014, 5 pages.
Foreign Communication From a Counterpart Application, PCT Application No. PCT/US2014/034985, International Search Report dated Jul. 31, 2014, 5 pages.
Foreign Communication From a Counterpart Application, PCT Application No. PCT/US2014/034985, Written Opinion dated Jul. 31, 2014, 5 pages.
"Series G: Transmission Systems and Media, Digital Systems and Networks, Digital Sections and Digital Line System—Optical Line Systems for Local and Access Networks, Broadband Optical Access Systems Based on Passive Optical Networks (PON)", ITU-T Recommendation G.983.1, Jan. 2005, 124 pages.
"Series G: Transmission Systems and Media, Digital Systems and Networks, Digital Sections and Digital Line System—Optical Line Systems for Local and Access Networks, Broadband Optical Access Systems Based on Passive Optical Networks (PON), Amendment 1: PICS for OLT and ONU", ITU-T Recommendation G.983.1 Amendment 1, May 2005, 60 pages.
"Series G: Transmission Systems and Media, Digital Systems and Networks, Digital Sections and Digital Line System—Optical Line Systems for Local and Access Networks, Broadband Optical Access Systems Based on Passive Optical Networks (PON)", ITUT-T Recommendation G.983.1 Erratum 1, Mar. 2006, 1 page.

"Series G: Transmission Systems and Media, Digital Systems and Networks, Digital Sections and Digital Line System—Optical Line Systems for Local and Access Networks, ONT Management and Control Interface Specification for B-PON", ITU-T Recommendation G.983.2, Jul. 2005, 370 pages.
"Series G: Transmission Systems and Media, Digital Systems and Networks, Digital Sections and Digital Line System—Optical Line Systems for Local and Access Networks, ONT Management and Control Interface Specification for B-PON, Amendment 1: Omnibus Improvements for OMCI", ITU-T Recommendation G.983.2 Amendment 1, Mar. 2006, 198 pages.
"Series G: Transmission Systems and Media, Digital Systems and Networks, Digital Sections and Digital Line System—Optical Line Systems for Local and Access Networks, ONT Management and Control Interface Specification for B-PON, Amendment 2", ITU-T Recommendation G.983.2 Amendment 2, Jan. 2007, 64 pages.
"Series G: Transmission Systems and Media, Digital Systems and Networks, Digital Sections and Digital Line System—Optical Line Systems for Local and Access Networks, ONT Management and Control Interface Specification for B-PON, Erratum 1", ITU-T Recommendation G.983.2 Erratum 1, Jun. 2006, 1 page.
"Series G: Transmission Systems and Media, Digital Systems and Networks, Digital Sections and Digital Line System—Optical Line Systems for Local and Access Networks, A Broadband Optical Access System with Increased Service Capability by Wavelength Allocation", ITU-T Recommendation G.983.3, Mar. 2001, 59 pages.
"Series G: Transmission Systems and Media, Digital Systems and Networks, Digital Sections and Digital Line System—Optical Line Systems for Local and Access Networks, A Broadband Optical Access System with Increased Service Capability Using Dynamic Bandwidth Assignment", ITU-T Recommendation G.983.4, Nov. 2001, 92 pages.
"Series G: Transmission Systems and Media, Digital Systems and Networks, Digital Sections and Digital Line System—Optical Line Systems for Local and Access Networks, A Broadband Optical Access System with Increased Service Capability Using Dynamic Bandwidth Assignment, Amendment 1: New Annex A—Performance Monitoring Parameters", ITU-T Recommendation G.983.4 Amendment 1, Dec. 2003, 12 pages.
Series G: Transmission Systems and Media, Digital Systems and Networks, Digital Sections and Digital Line System—Optical Line Systems for Local and Access Networks, A Broadband Optical Access System with Increased Service Capability Using Dynamic Bandwidth Assignment, G.983.4, Corrigendum 1, Jan. 2005, 8 pages.
"Series G: Transmission Systems and Media, Digital Systems and Networks, Digital Sections and Digital Line System—Optical Line Systems for Local and Access Networks, A Broadband Optical Access System with Enhanced Survivability", ITU-T Recommendation G.983.5, Jan. 2002, 60 pages.
"Series G: Transmission Systems and Media, Digital Systems and Networks, Digital Sections and Digital Line System—Optical Line Systems for Local and Access Networks, Gigabit-capable Passive Optical Networks (GPON): General Characteristics", ITU-T Recommendation G.984.1, Mar. 2008, 43 pages.
"Series G: Transmission Systems and Media, Digital Systems and Networks, Digital Sections and Digital Line System—Optical Line Systems for Local and Access Networks, Gigabit-capable Passive Optical Networks (GPON): Physical Media Dependent (PMD) Layer Specification", ITU-T Recommendation G.984.2, Mar. 2003, 38 pages.
"Series G: Transmission Systems and Media, Digital Systems and Networks, Digital Sections and Digital Line System—Optical Line Systems for Local and Access Networks, Gigabit-capable Passive Optical Networks (GPON): Physical Media Dependent (PMD) Layer Specification, Amendment 1: New Appendix III—Industry Best Practice for 2.488 Gbit/s Downstream, 1.244 Gbit/s Upstream G-PON", ITU-T Recommendation G.984.2 Amendment 1, Feb. 2006, 12 pages.
"Series G: Transmission Systems and Media, Digital Systems and Networks, Digital Sections and Digital Line System—Optical Line Systems for Local and Access Networks, Gigabit-capable Passive Optical Networks (GPON): Physical Media Dependent (PMD) Layer (56) References Cited

OTHER PUBLICATIONS

Specification, Amendment 2", ITU-T Recommendation G.984.2 Amendment 2, Mar. 2008, 16 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification", ITU-T Recommendation G.984.3, Mar. 2008, 146 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, Amendment 1—Specification of the ONU Registration Method and Various Clarifications", ITU-T Recommendation G.984.3 Amendment 1, Feb. 2009, 16 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, Amendment 2: Time-of-Day Distribution and Maintenance Updates and Clarifications", ITU-T Recommendation G.984.3 Amendment 2, Nov. 2009, 18 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, Amendment 3", ITU-T Recommendation G.984.3 Amendment 3, Apr. 2012, 18 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, Erratum 1", ITU-T Recommendation G.984.3, Erratum 1, Apr. 2010, 1 page.
"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification", ITU-T Recommendation 984.4, Feb. 2008, 430 pages.
"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, Amendment 1", ITU-T Recommendation G.984.4 Amendment 1, Jun. 2009, 92 pages.
"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, Erratum 1", ITU-T Recommendation G.984.4 Erratum 1, Aug. 2009, 2 pages.
"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, Amendment 2: Changes and Extensions to the OMCI, Editorial Clarifications and Corrections", ITU-T Recommendation G.984.4 Amendment 2, Nov. 2009, 164 pages.
"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, Amendment 3: Clarification of Scope of Application", ITU-T Recommendation G984A Amendment 3, Jul. 2010, 10 pages.
"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, Corrigendum 1", ITU-T Recommendation G.984A, Corrigendum 1, Mar. 2010, 8 pages.
"Series G: Transmission Systems and Media, Digital Systems and Networks, Digital Sections and Digital Line System—Optical Line Systems for Local and Access Networks, Gigabit-capable Passive Optical Networks (G-PON): Enhancement Band", ITU-T Recommendation G.984.5, Sep. 2007, 22 pages.
"Series G: Transmission Systems and Media, Digital Systems and Networks, Digital Sections and Digital Line System—Optical Line Systems for Local and Access Networks, Gigabit-capable Passive Optical Networks (G-PON): Enhancement Band, Amendment 1", ITU-T Recommendation G.984.5 Amendment 1, Oct. 2009, 12 pages.
"Series G: Transmission Systems and Media, Digital Systems and Networks, Digital Sections and Digital Line System—Optical Line Systems for Local and Access Networks, Gigabit-capable Passive Optical Networks (G-PON): Reach Extension", ITU-T Recommendation G.984.6, Mar. 2008, 40 pages.
"Series G: Transmission Systems and Media, Digital Systems and Networks, Digital Sections and Digital Line System—Optical Line Systems for Local and Access Networks, Gigabit-capable Passive Optical Networks (G-PON): Reach Extension, Amendment 1: Wavelength-converting, Continuous Mode, and 1:N-protected Range Extenders", ITU-T Recommendation G.984.6 Amendment 1, Nov. 2009, 28 pages.
"Series G: Transmission Systems and Media, Digital Systems and Networks, Digital Sections and Digital Line System—Optical Line Systems for Local and Access Networks, Gigabit-capable Passive Optical Networks (G-PON): Reach Extension, Amendment 2", ITU-T Recommendation G.984.6 Amendment 2, May 2012, 16 pages.
"Series G: Transmission Systems and Media, Digital Systems and Networks, Digital Sections and Digital Line System—Optical Line Systems for Local and Access Networks, Gigabit-capable Passive Optical Networks (G-PON): Long Reach", ITU-T Recommendation G.984.7, Jul. 2010, 14 pages.
"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks", IEEE Standard 802.3ah, Sep. 7, 2004, 640 pages.
"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment 1: Physical Layer Specifications and Management Parameters for 10 Gb/s Passive Optical Networks", IEEE Standard 802.3av, Oct. 30, 2009, 236 pages.
IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications:, IEEE Standard 802.11, Jun. 12, 2007, 1232 pages.

\* cited by examiner

ALLOCATING ORTHOGONAL FREQUENCY-DIVISION MULTIPLE ACCESS (OFDMA) RESOURCES IN ETHERNET PASSIVE OPTICAL NETWORK(PON) OVER COAXIAL (EPOC)

CROSS-REFERENCE TO RELATED APPLICATIONS

The present application claims priority to U.S. Provisional Patent Application 61/814,714, filed Apr. 22, 2013 by Fang Lin Sun, et. al., and entitled "Method and Apparatus of Allocating Orthogonal Frequency-Division Multiple Access Resource Blocks in Ethernet Passive Optical Network Protocol Over Coaxial" and U.S. Provisional Patent Application 61/817,534, filed Apr. 30, 2013 by Fang Lin Sun, et. al., and entitled "Method and Apparatus of Allocating Orthogonal Frequency-Division Multiple Access Resource Blocks in Ethernet Passive Optical Network Protocol Over Coaxial", both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A Passive Optical Network (PON) is one system for providing core network access to end users. A PON may be a Point-to-Multipoint (P2MP) network with passive splitters positioned in an Optical Distribution Network (ODN) to enable a single feeding fiber from a central office to serve multiple customer premises. PON may employ different wavelengths for upstream and downstream transmissions. EPON is a PON standard developed by the Institute of Electrical and Electronics Engineers (IEEE) and specified in IEEE documents 802.3ah and 802.3av, both of which are incorporated herein by reference. Hybrid access networks employing both EPON and other network types have attracted growing attention.

SUMMARY

In one embodiment, the disclosure includes a Coaxial Network Unit (CNU) comprising a transmitter configured to transmit an Ethernet Passive Optical Network (EPON) report message toward an Optical Line Terminal (OLT) via a coaxial network and an optical network, wherein the EPON report message requests an upstream transmission time grant to transmit a specified amount of data, a receiver configured to receive an EPON gate message comprising Time Quanta (TQ) information indicating an upstream transmission time grant across the optical network, a processor coupled to the receiver and the transmitter and configured to obtain a resource profile indicating upstream frequency parameters associated with the coaxial network, translate the TQ information and the resource profile into one or more Orthogonal frequency-division multiplexing (OFDM) resource blocks, wherein each OFDM resource block indicates an upstream OFDM resource allocation in a time domain and in a frequency domain across the coaxial network; and schedule an upstream transmission by employing the OFDM resource blocks translated from the TQ information and the resource profile.

In another embodiment, the disclosure includes a method implemented in an Fiber Coaxial Unit (FCU) comprising receiving a plurality of EPON report messages from a plurality of CNUs across a coaxial network, receiving an EPON gate message comprising TQ information indicating an upstream transmission time grant for the FCU across the optical network, translating the TQ based upstream transmission time grants to OFDM resource block grants in a time domain and in a frequency domain across the coaxial network for each CNU based on the configurable constants, and transmitting an EPON over Coaxial (EPoC) gate message to each CNU, wherein each EPoC gate message comprises a CNU profile indicating the OFDM resource block grants for the an associated CNU and a start time.

In another embodiment, the disclosure includes a method comprising receiving, by an OLT, a EPON report messages from a plurality of CNUs via an electro-optical network, wherein the EPON report messages request upstream transmission grants, allocating at least one OFDM resource block to each CNU for upstream transmission, wherein each resource block comprises allocated upstream OFDM resources in a time domain and in a frequency domain across a coaxial portion of the electro-optical network, and transmitting EPON gate messages across the electro-optical network to indicate the resource block allocations for the CNUs. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Some hybrid access networks may combine optical networks with coaxial (coax) networks. Ethernet over Coax (EoC) may be a generic name used to describe all technologies that transmit Ethernet frames over a coaxial network. Examples of EoC technologies may include EPoC, Data Over Cable Services Interface Specification (DOCSIS), multimedia over coax alliance (MoCA), G.hn (a common name for a home network technology family of standards developed under the International Telecommunication Union (ITU) and promoted by the HomeGrid Forum), home phoneline networking alliance (HPNA), and home plug audio/visual (A/V). EoC technologies may have been adapted to run outdoor coax access from an Optical Network Unit (ONU) to an EoC head end with connected customer premises equipment (CPEs) located in subscriber homes. In a coaxial network, physical layer transmission may employ OFDM to encode digital data onto multiple carrier frequencies. Some advantages of OFDM transmission may include high spectral efficiency and robust transmission (e.g. attenuation at high frequencies in long coaxial wires, narrow band interferers, frequency selective noise, etc.).

An EPoC system may be a hybrid access network employing both optical and coaxial technologies. The EPoC may comprise an optical segment that may comprise a PON, and a coaxial segment that may comprise a coaxial cable network. In the PON segment, an OLT may be positioned in a local exchange or central office where the OLT may connect the EPoC access network to an Internet Protocol (IP), Synchronous Optical Network (SONET), and/or Asynchronous Transfer Mode (ATM) backbone. In the coaxial segment, CNUs may be positioned at end-user locations, and each CNU may serve a plurality (e.g. three to four) of end users which may be known as subscribers. A Fiber Coaxial Unit (FCU) may merge the interface between the PON segment and the coaxial segment of the network. The FCU may be a single box unit that may be located where a PON segment and the coaxial segment are fused together, for example, at a curb or at a basement of an apartment building. The FCU may employ OFDM transmission at a physical layer to communicate with the CNUs. In some embodiments, the FCU may also be referred to as a Coaxial Line Terminal (CLT).

Disclosed herein is a mechanism for translating optical network upstream grants in the time domain to corresponding electrical network upstream grants in the time and frequency domains (e.g. from a one dimensional (1D) grant to a two dimensional (2D) grant). The time and frequency employed to transmit an amount of data may be grouped as a resource block in an EPoC network. Optical grants may be characterized in units of TQ. An FCU or a CNU, depending on the embodiment, may translate a TQ grant in an EPON gate message to a resource block grant based on a profile specific to each CNU. In embodiments where the CNU performs the translation, the profiles may be transmitted to the CNUs as part of an EPoC gate message or other Operation, Administration, and Maintenance (OAM) message. The profiles and/or the TQ translation may be configurable based on electrical network connectivity constraints (e.g. Signal to Noise Ratio (SNR)) and/or a requested amount of data to be transmitted by a specific CNU. Accordingly, each CNU may be assigned resource blocks comprising different time and/or frequency resources. Pilot signals may be inserted between resource blocks to differentiate between data transmissions (e.g. by different CNUs using adjacent time/frequency resources.) In an embodiment, a resource block may comprise a portion of an OFDM symbol, where each resource block comprises the same bit loading capacity. In another embodiment, a resource block may comprise a portion of an OFDM symbol, where each resource block comprises the same number of subcarriers (e.g. frequencies) and different bit loading capacity. In either embodiment, each subcarrier (e.g. tones, frequency set, etc.) in a resource block may comprise the same Quadrature amplitude modulation (QAM) constellation/modulation order as all other subcarriers in the resource block. Subcarriers in different resource blocks may comprise different QAM constellations. Data carrying pilot signals may comprise a lower modulation order than non-pilot signals in the same resource block. The present disclosure further relates to U.S. non-provisional application by Fang Lin Sun, et. al. and entitled "Allocating Orthogonal Frequency-Division Multiple Access (OFDMA) Resources In Data Over Cable Services Interface Specification (DOCSIS) Networks", which is filed herewith and is incorporated by reference as if reproduced in its entirety.

Figure 1:
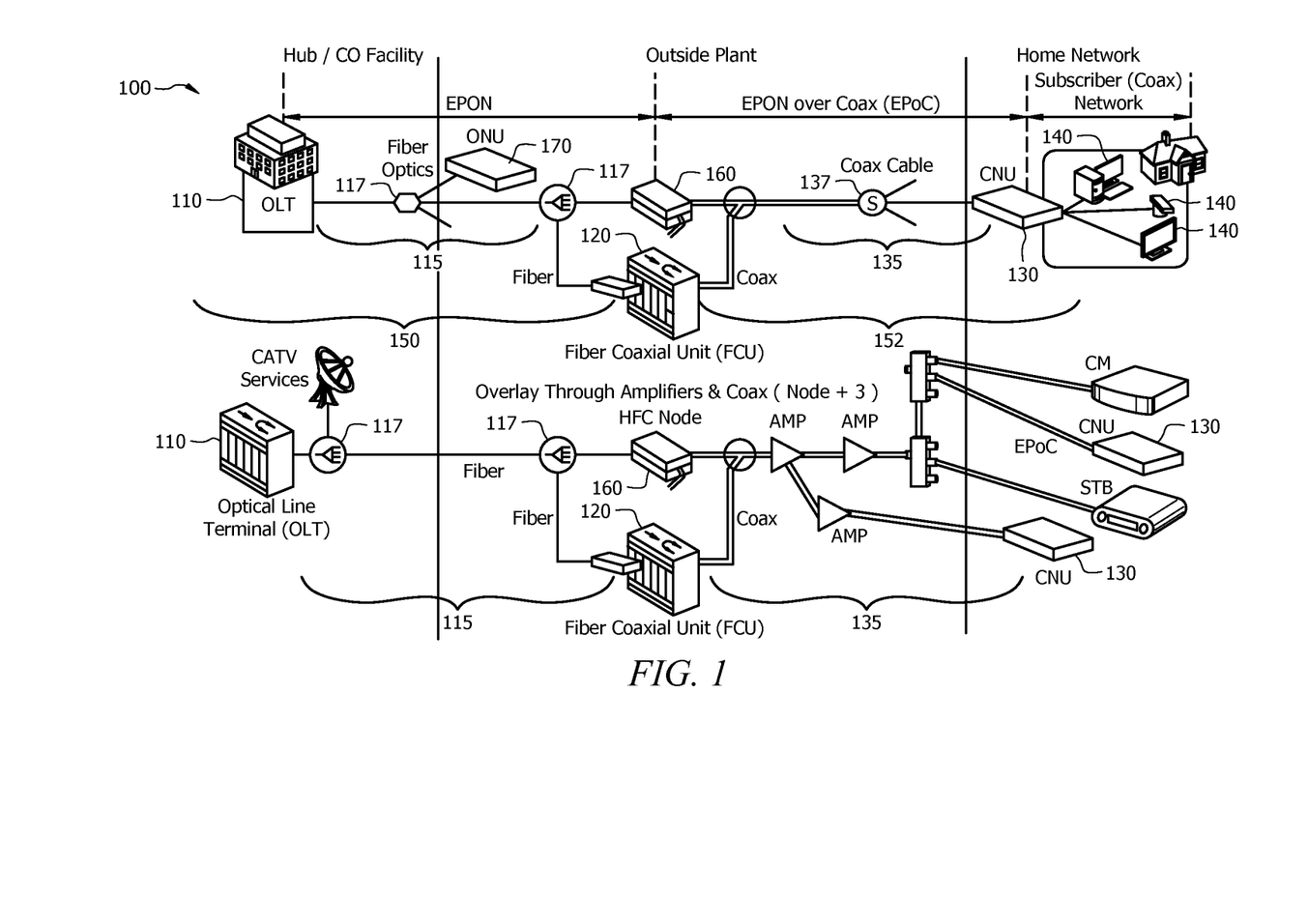
FIG. 1 is a schematic diagram of an embodiment of a unified optical-coaxial network.

FIG. 1 is a schematic diagram of an embodiment of a unified optical-coaxial network 100 comprising an optical portion 150 and an electrical (e.g. coaxial) portion 152. The network 100 may include an OLT 110, at least one CNU 130 coupled to a plurality of subscriber devices 140, and an FCU 120 positioned between the OLT 110 and the CNU 130, e.g., between the optical portion 150 and the electrical portion 152. The OLT 110 may be coupled via an ODN 115 to the FCUs 120, and optionally to one or more ONUs 170, or one or more Hybrid Fiber Coax (HFC) nodes 160 in the optical portion 150. The ODN 115 may comprise fiber optics and an optical splitter 117 and/or a cascade of 1×M passive optical splitters that couple OLT 110 to the FCU 120 and any ONUs 170. The value of Min EPoC, e.g., the number of FCUs, may for example be 4, 8, 16, or other values and may be selected by the operator depending on factors such as optical power budget. The FCU 120 may be coupled to the CNUs 130 via an electrical distribution network (EDN) 135, which may comprise a cable splitter 137, a cascade of taps/splitters, and/or one or more amplifiers. Each OLT 110 port may serve 32, 64, 128 or 256 CNUs 130. It should be noted that the upstream transmissions from CNUs 130 may reach the FCU 120 and not the other CNUs 130 due to a directional property of the tap. The distances between the OLT 110 and the ONUs 170 and/or FCUs 120 may range from about 10 to about 20 kilometers (km), and the distances between the FCU 120 and CNUs 130 may range from about 100 to about 500 meters (m). The network 100 may comprise any number of HFCs 160, FCUs 120 and corresponding CNUs 130. The components of network 100 may be arranged as shown in FIG. 1 or any other suitable arrangement.

The optical portion 150 of the network 100 may be similar to a PON in that the optical portion 150 may be a communications network that does not require active components to distribute data between the OLT 110 and the FCU 120. Instead, the optical portion 150 may use the passive optical components in the ODN 115 to distribute data between the OLT 110 and the FCU 120. Examples of suitable protocols that may be implemented in the optical portion 150 may include asynchronous transfer mode PON (APON) or broadband PON (BPON) defined by the ITU Telecommunication Standardization Sector (ITU-T) documents G.983, Gigabit PON (GPON) defined by ITU-T documents G.984, the EPON defined by IEEE documents 802.3ah and 802.3av, all of which are incorporated by reference as if reproduced in their entirety, the wavelength division multiplexing (WDM) PON (WDM-PON), and the Next Generation EPON (NGE-PON) in development by IEEE.

The OLT 110 may be any device configured to communicate with the CNUs 130 via the FCU 120. The OLT 110 may act as an intermediary between the FCUs 120 and/or CNUs 130 and another backbone network (e.g. the Internet). The OLT 110 may forward data received from a backbone network to the FCUs 120 and/or CNUs 130 and forward data received from the FCUs 120 or CNUs 130 onto the backbone network. Although the specific configuration of the OLT 110 may vary depending on the type of optical protocol implemented in the optical portion 150, in an embodiment, OLT 110 may comprise an optical transmitter and an optical receiver. When the backbone network employs a network protocol that is different from the protocol used in the optical portion 150, OLT 110 may comprise a converter that may convert the backbone network protocol into the protocol of the optical portion 150. The OLT converter may also convert the optical portion 150 protocol into the backbone network protocol.

The ODN 115 may be a data distribution system that may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the FCU 120. It should be noted that the optical fiber cables may be replaced by any optical transmission media in some embodiments. In some embodiments, the ODN 115 may comprise one or more optical amplifiers. In some embodiments, data distributed across the ODN may be combined with cable television (CATV) services using multiplexing schemes. The ODN 115 may extend from the OLT 110 to the FCU 120 and any optional ONUs 170 in a branching configuration as shown in FIG. 1, but may be alternatively configured as determined by a person of ordinary skill in the art. Signals transmitted across the ODN 115 may be transmitted as digital signals.

The FCU 120 may be any device or component configured to forward downstream data from the OLT 110 to the corresponding CNUs 130 and forward upstream data from the CNUs 130 to the OLT 110. The FCU 120 may convert the downstream and upstream data appropriately to transfer the data between the optical portion 150 and the electrical portion 152. The data transferred over the ODN 115 may be transmitted and/or received in the form of optical signals, and the data transferred over the EDN 135 may be transmitted and/or received in the form of electrical signals that may have the same or different logical structure as compared with the optical signals. For example, the FCU 120 may convert between digital signals in the ODN 115 and analog signals in the EDN 135. As such, the FCU 120 may encapsulate or frame the data in the optical portion 150 and the electrical portion 152 differently. In an embodiment, the FCU 120 may include a Media Access Control (MAC) layer and physical (PHY) layers, corresponding to the type of signals carried over the respective media. The MAC layer may provide addressing and channel access control services to the PHY layers. As such, the PHY may comprise an optical PHY and a coaxial PHY. In many embodiments, the FCU 120 may be transparent to the CNU 130 and OLT 110 in that the frames sent from the OLT 110 to the CNU 130 may be directly addressed to the CNU 130 (e.g. in the destination address), and vice-versa. As such, the FCU 120 may intermediate between network portions, namely an optical portion 150 and a electrical portion 152 in the example of FIG. 1.

The ONUs 170 may be any devices that are configured to communicate with the OLT 110 and may terminate the optical portion 150 of the network. The ONUs 170 may present customer service interfaces to end users.

The electrical portion 152 of the network 100 may be similar to any known electrical communication system. The electrical portion 152 may not require any active components to distribute data between the FCU 120 and the CNU 130. Instead, the electrical portion 152 may use the passive electrical components in the electrical portion 152 to distribute data between the FCU 120 and the CNUs 130. Alternatively, the electrical portion 152 may use some active components, such as amplifiers. Examples of suitable protocols that may be implemented in the electrical portion 152 include MoCA, G.hn, HPNA, and Home Plug A/V.

The EDN 135 may be a data distribution system that may comprise electrical cables (e.g. coaxial cables, twisted wires, etc.), couplers, splitters, distributors, and/or other equipment. In an embodiment, the electrical cables, couplers, splitters, distributors, and/or other equipment may be passive electrical components. Specifically, the electrical cables, couplers, splitters, distributors, and/or other equipment may be components that do not require any power to distribute data signals between the FCU 120 and the CNU 130. It should be noted that the electrical cables may be replaced by any electrical transmission media in some embodiments. In some embodiments, the EDN 135 may comprise one or more electrical amplifiers. The EDN 135 may extend from the FCU 120 to the CNU 130 in a branching configuration as shown in FIG. 1, but may be alternatively configured as determined by a person of ordinary skill in the art. The EDN 135 may be configured to communicate electrical signals in an analog form to support OFDM/OFDMA.

In an embodiment, the CNUs 130 may be any devices that are configured to communicate with the OLT 110, the FCU 120, and any subscriber devices 140. The CNUs 130 may act as intermediaries between the FCU 120 and the subscriber devices 140. For instance, the CNUs 130 may forward data received from the FCU 120 to the subscriber devices 140, and may forward data received from the subscriber devices 140 toward the OLT 110. Although the specific configuration of the CNUs 130 may vary depending on the type of network 100, in an embodiment, the CNUs 130 may comprise an electrical transmitter configured to send electrical signals to the FCU 120 and an electrical receiver configured to receive electrical signals from the FCU 120. Additionally, the CNUs 130 may comprise a converter that may convert FCU 120 electrical signals into electrical signals for the subscriber devices 140, such as signals in IEEE 802.11 wireless local area network (WiFi) protocol. The CNUs 130 may further comprise a second transmitter and/or receiver that may send and/or receive the converted electrical signals to the subscriber devices 140. In some embodiments, CNUs 130 and coaxial network terminals (CNTs) are similar, and thus the terms are used interchangeably herein. The CNUs 130 may be typically located at distributed locations, such as the customer premises, but may be located at other locations as well. CNUs 130 may transmit a configurable number of OFDM frames upstream toward the OLT 110 via FCU 120 as part of a transmission burst. An OFDM frame may be a communication burst of a specified duration comprising a signal with a plurality of frequency based subcarriers. An OFDM frame may comprise a configurable number of OFDM symbols with smaller durations than the OFDM frame. OFDM symbols may comprise a configurable number of resource blocks, where resource blocks may be a shorter duration than an OFDM symbol and may comprise less than all frequencies in the OFDM symbol.

The subscriber devices 140 may be any devices configured to interface with a user or a user device. For example, the subscribed devices 140 may include desktop computers, laptop computers, tablets, mobile telephones, residential gateways, televisions, set-top boxes, and similar devices.

The components of network 100 may be employed to allocate 2D OFDM resource blocks to the CNUs 130 for upstream transmission across the EDN 135 based on 1D time based grants allocated in the ODN 115. In an embodiment, the OLT 110 may consider upstream transmission requests from the CNUs 130 received in EPON report messages. The OLT 110 may consider the amount of data each CNU 130 wishes to transmit along with connectivity constraints (e.g. SNR, power constraints, etc.) associated with each CNU 130, and may assign appropriate OFDM resource blocks to each CNU 130. The OLT 110 may transmit the assignment as an EPoC channel profile. The EPoC channel profile may be transmitted to the CNU in any EPON/EpoC allocation message (e.g. Multi-Point Control Protocol (MPCP) gate message, Operation, Administration, and Maintenance (OAM) message, etc.) The allocation message may indicate the assignment via resource block number, specify the OFDM subcarriers to be employed along with a byte or bit count, and/or indicate a transmission duration. The OLT 110 may also indicate pilot signals to be employed by the CNUs 130 during transmission. Such pilot symbols may be placed in the transmission to allow the OLT 110 to distinguish between transmissions from different CNUs 130 and/or transmissions with different Logical Link Identifiers (LLIDs). The pilot symbols may or may not comprise data. All signals in a resource block may employ the same modulation order, but signals in different resource blocks may comprise different modulation orders. In an embodiment, pilot signals may comprise the same modulation order as other pilot signals in a resource block, but may comprise a lower modulation order than data signals in the resource block.

In another embodiment, the network 100 may employ a two stage scheduling process. The OLT 110 may transmit TQ based time grants to each FCU 120 in the network 100. The FCU 120 may then translate the TQ based grants into OFDM grants across the EDN 135 based on profiles that are specific to each CNU 130. Such profiles may comprise information indicating connectivity constraints associated with the CNU 130, modulation order(s) to be employed during transmission, and/or an amount of data to be transmitted. Timing in the EDN 135 may be managed independently of timing in the ODN 115. Accordingly, the FCU 120 may translate TQ based instructions into a form usable by the EDN 135 by performing mathematical operations (e.g. multiplying, dividing, etc.) on the TQ based on a constant specific to the FCUs 120 portion of the EDN 135. The constant may be configurable by the FCU 120 and/or the OLT 110.

For example, one TQ in the ODN 115 may be sufficient time to transmit two bytes. Further, TQ values may be selected as powers of two (e.g. $2^N$). Accordingly, when an example ODN 115 grant is 128 TQ ($2^7$, 256 bytes) for a CNU 130, the FCU 120 may allocate 256 bytes of resource blocks to the CNU 130 across the EDN 135. For example, if an OFDM symbol of a specified duration in the EDN 135 can transmit 512 bytes by employing four subcarriers (which may have equal bit-loading capacity for clarity of discussion), the FCU 120 may assign resource blocks comprising two subcarriers for one OFDM symbol, four subcarriers for half a symbol, etc. Accordingly, the configurable constant may be any value that correlates TQ to OFDM resource block(s) associated with a given EDN 135 and/or CNU 130. The OFDM grants (e.g. subcarrier frequency and time grant) may be transmitted to the CNUs 130 via an allocation message. As such, each CNU 130 may be assigned resource blocks based on the CNU's 130 modulation capabilities instead of requiring all CNUs 130 to modulate data based on the connectivity of the CNU 130 with the worst connection. TQ may also be translated to OFDM resource blocks by holding a number of subcarriers constant for each resource block instead of correlating bit load capacity of the TQ to bit loading capacity for the resource block.

In another embodiment, each CNU 130 may translate TQ time grants from the OLT 110 in addition to and/or instead of the FCU 120. Each CNU 130 may receive an EPoC channel profile (e.g. which may indicate available active subcarriers and/or bit loading for each subcarrier based on local connectivity constraints) and/or a configurable constant from the OLT 110 and/or the FCU 120. Alternatively, the profile and/or constants may be manually installed at the CNU 130 prior to runtime (e.g. during initial setup). The CNU 130 may select OFDM resource blocks for transmission based on the profiles and a TQ value received from the OLT 110 in an EPON gate message (e.g. based on the configurable constant and/or profile).

Regardless of the embodiment, resource blocks may be selected based on predefined rules for network 100. For example, each OFDM frame may comprise a plurality of OFDM symbols. Each OFDM symbol may comprise a plurality of subcarriers. Resource blocks may be selected so that each resource block has the same bit loading capacity. Such a resource block selection may result in varied numbers of active frequencies, tones, subcarriers, etc., as some subcarriers may comprise differing bit loading capacities than other subcarriers. Resource blocks may also be selected so that each resource block comprises the same number of active subcarriers, but a different bit loading capacity. All active subcarriers in a resource block may comprise the same QAM constellation/modulation order. Subcarriers in different resource blocks may comprise different QAM constellation/modulation orders. Pilot signals may comprise different (e.g. lower) QAM constellation/modulation orders than other subcarriers in the same resource block. Both subcarriers and pilot signals may carry data in some embodiments. Pilot signals may also be referred to as complementary subcarriers.

It should be noted that OFDMA may be a similar technology to OFDM. Specifically, OFDMA may be a subset of OFDM that may employ dynamic allocation of time/frequency resources. Accordingly, OFDM as used herein may be considered to include OFDMA.

Figure 2:
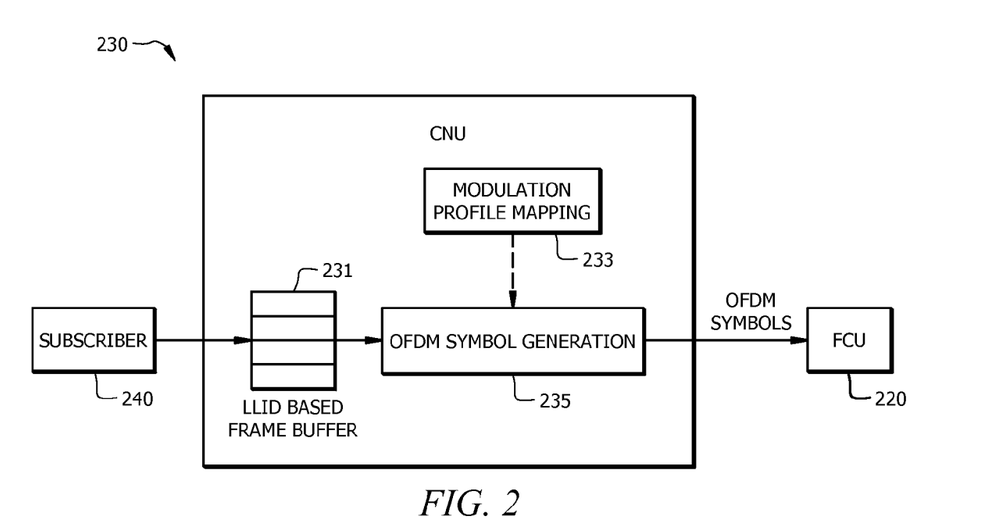
FIG. 2 is a schematic diagram of an embodiment of a CNU.

FIG. 2 is a schematic diagram of an embodiment of a CNU 230. The CNU 230 may be coupled to a subscriber device 240, via a wired or wireless network and an FCU 220 via a coaxial network in a manner similar to network 100. Subscriber device 240 and FCU 220 may be substantially similar to subscriber device 140 and FCU 120, respectively. CNU 230 may comprise an LLID based frame buffer 231, a modulation profile mapping module 233, and an OFDM symbol generation module 235.

A plurality of LLIDs may be assigned to CNU 230 to allow the FCU 220 and/or an OLT to distinguish between communications associated with a plurality of subscriber devices 240, communications with different purposes (e.g. distinguish between voice services and data services), etc. Communications associated with different LLIDs may be transmitted by employing different resource blocks. An LLID frame buffer 231 may store frames from subscriber device 240 and forward the frames for upstream transmission during an assigned resource block. Modulation profile mapping module 233 may store a profile associated with the CNU 230. The profile may comprise a mapping that may indicate subcarriers that may be employed by the CNU 230. For example, an OLT or an FCU 220 may assign some subcarriers to CNU 230 and other subcarriers to another CNU, so that both CNUs can transmit upstream data simultaneously. The assigned subcarriers may be allocated based on CNU 230 capability. For example, CNU 230 may be unable to transmit a usable signal on specific subcarriers because of electrical noise signals induced in the electrical network by other electrical devices in close proximity to the CNU 230. Such subcarriers may instead be allocated to another CNU with potentially different connectivity constraints. The mapping module 233 may also store timing data from an OLT and/or FCU 220 (e.g. from a gate message) that may be employed to indicate the start time and/or duration allocated to the CNU 230 for an upstream transmission. The CNU 230 may employ the OFDM symbol generation module 235 to generate symbols for the data in the LLID buffer 231 based on the mapping from the mapping module 233. Such symbols may carry a plurality of LLID communications simultaneously on different subcarriers. The time and frequency resources allocated for a particular transmission of a particular LLID may be referred to as a resource block, as discussed with respect to network 100. The resource block allocations may be determined by the CNU 230 based on a frequency assignment for the LLIDs (e.g. based on a profile received from the OLT and/or FCU 220 upon initial connection, received periodically, received upon occurrence of a network transmission plan restricting, etc.) and a TQ measured from an EPoC gate message from the OLT and/or FCU 220. In another embodiment, the resource block allocations may be explicitly received from the OLT and/or FCU 220 prior to each upstream transmission cycle.

Figure 3:
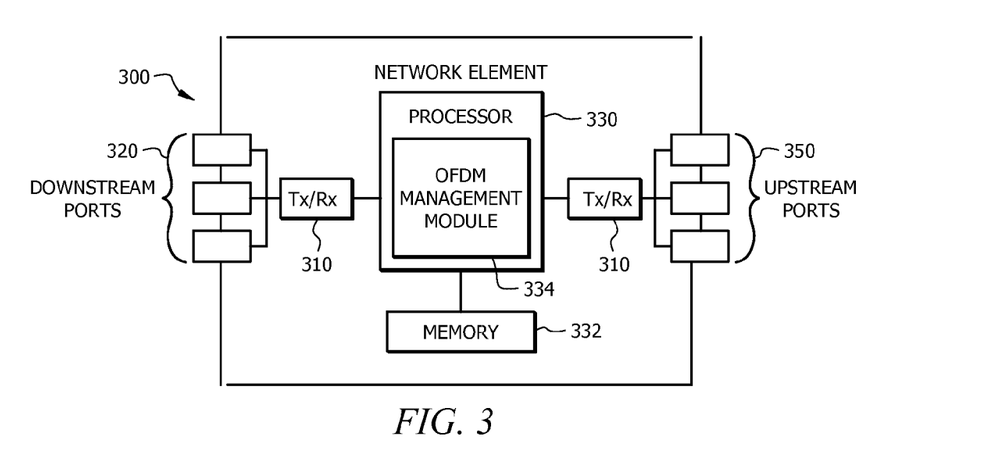
FIG. 3 is a schematic diagram of an embodiment of a network element (NE), which may act as a node in an EPoC network.

FIG. 3 is a schematic diagram of an embodiment of an NE 300, which may act as an OLT 110, FCU 120, CNU 130, and/or CNU 230 by implementing any of the schemes described herein. In some embodiments NE 300 may also act as other node(s) in network 100, such as a media converter unit that may be coupled to an optical access network and an electrical wireless (e.g. WiFi) or wired network (e.g. coaxial, any Digital Subscriber Line (xDSL), powerline, etc) that employs OFDM transmission. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features/methods described in the disclosure may be implemented in a network apparatus or component such as NE 300. For instance, the features/methods in the disclosure may be implemented using hardware, firmware, and/or software installed to run on hardware. As shown in FIG. 3, the NE 300 may comprise transceivers (Tx/Rx) 310, which may be transmitters, receivers, or combinations thereof. A Tx/Rx 310 may be coupled to plurality of downstream ports 320 for transmitting and/or receiving frames from other nodes and a Tx/Rx 310 may be coupled to plurality of upstream ports 350 for transmitting and/or receiving frames from other nodes, respectively. A processor 330 may be coupled to the Tx/Rx 310 to process the frames and/or determine which nodes to send the frames to. The processor 330 may comprise one or more multi-core processors and/or memory devices 332, which may function as data stores, buffers, etc. Processor 330 may be implemented as a general processor or may be part of one or more application specific integrated circuits (ASICs) and/or digital signal processors (DSPs). Processor 330 may comprise an OFDM management module 334, which may allocate resource blocks, initiate transmission of allocation messages, process upstream transmission requests, process allocation messages, and/or translate TQ values into resource blocks. In an alternative embodiment, the OFDM management module 334 may be implemented as instructions stored in the memory devices 332, which may be executed by processor 330. The memory device 332 may comprise a cache for temporarily storing content, e.g., a Random Access Memory (RAM). Additionally, the memory device 332 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 300, at least one of the processor 330 and/or memory device 332 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
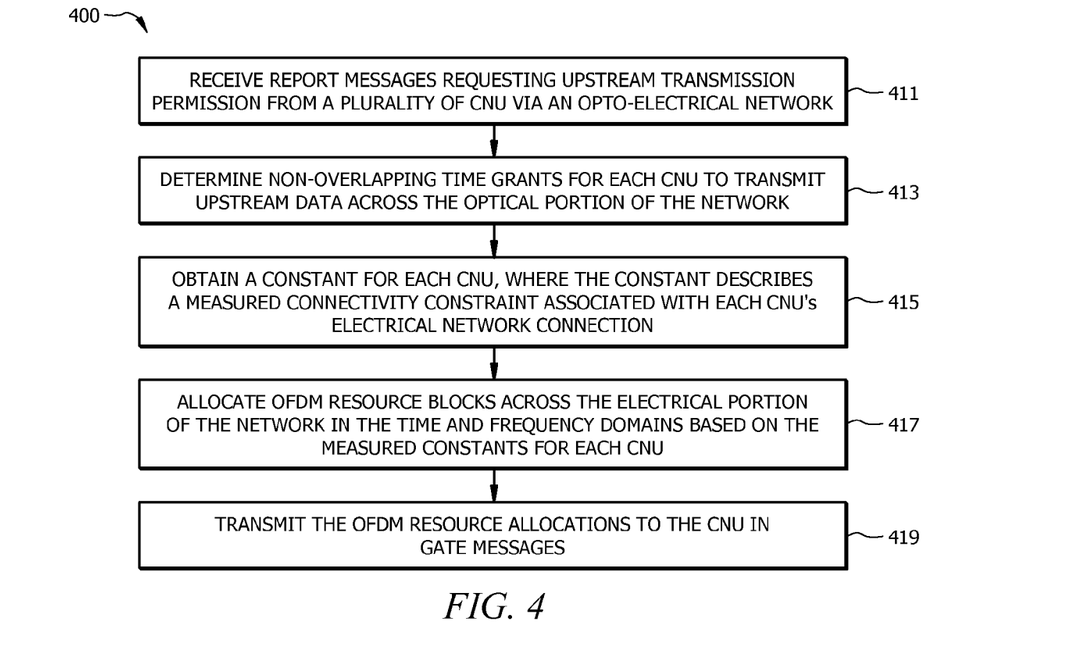
FIG. 4 is a flowchart of an embodiment of a method of OFDM allocation in an electrical network by an OLT.

FIG. 4 is a flowchart of an embodiment of a method 400 of OFDM allocation in an electrical network by an OLT, such as OLT 110. At step 411, a plurality of EPON report messages (e.g. Multi-Point Control Protocol (MPCP) reports) may be received from a plurality of CNUs (e.g. CNU 130 or 230) via an ODN, EDN, and an FCU (e.g. ODN 115, EDN 135, and FCU 120, respectively). The report messages may request upstream transmission permission for the CNUs via the opto-electric network. At step 413, non-overlapping time grants may be determined for each CNU to transmit upstream data across the optical portion of the network, for example using time division multiplexing. At step 415, a constant may be obtained for each CNU and/or for each EDN that may describe a measured connectivity constraint associated with the CNUs electrical network connection. For example, the constant may describe the bit loading capacity of the electrical connection. At step 417, OFDM resources (e.g. resource blocks) may be allocated across the electrical portion of the network in the time and frequency domain. The OFDM resources may be allocated to each CNU based on the measured constants for each coaxial unit and/or network connection. For example, the resources may be allocated to ensure that sufficient data has traversed the electrical network and/or been buffered at an electro-optical connection point (e.g. FCU) so that such data may be transmitted across the optical network during the associated time grant across the optical network. Such resources (resource blocks) may be allocated according to the network rules as discussed herein. For example, CNUs may be allocated resource blocks with different QAM modulation orders/QAM constellations/subcarriers depending on the CNU's capabilities so the CNUs may not all be required to transmit at a common modulation order shared with the CNU with the worst connection in the network. However, the CNUs may be allocated resources with constant QAM modulation orders/QAM constellations in a resource block. At step 419, the OFDM resource allocation may be transmitted to the CNUs in MPCP gate messages, grant messages, etc. As an example, an OFDM resource block allocation grant in a gate message from an OLT to a CNU could be five resource blocks. Three of the resource blocks may be loaded with CNU data using eight bit/256-QAM, while the other two resource blocks may be loaded with twelve bit/4096-QAM. The bit loading may be the same or different in the five OFDM resource blocks within a single allocation/gate message.

Figure 5:
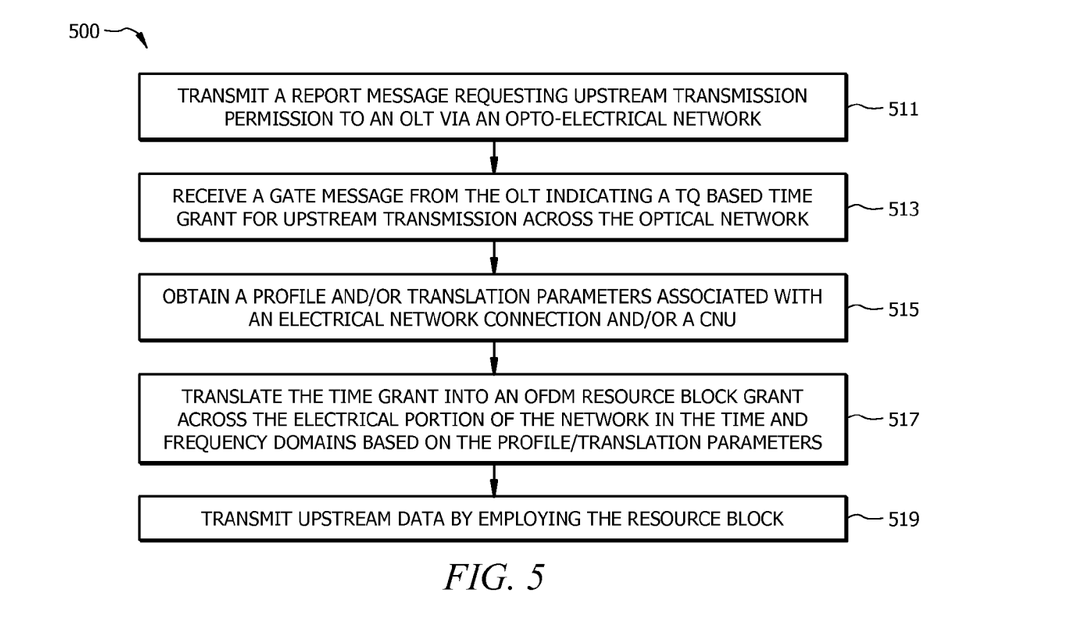
FIG. 5 is a flowchart of an embodiment of a method of TQ to OFDM translation in an electrical network by a CNU.

FIG. 5 is a flowchart of an embodiment of a method 500 of TQ to OFDM translation in an electrical network by a CNU, such as CNU 130 and/or 230. At step 511, a report message may be transmitted to an OLT (e.g. OLT 110). The report/request may request upstream transmission permission via an opto-electric network (e.g. network 100). At step 513, a gate message may be received from the OLT and may indicate a TQ based time grant for upstream transmission across the optical network (e.g. ODN 115). At step 515, a profile and/or translation parameters associated with an electrical network connection and/or a CNU may be obtained. For example, the profile may comprise a plurality of subcarriers allocated to the CNU for upstream transmission. The profile may be received from the OLT periodically and/or on the occurrence of a specific event. The translation parameter(s) may comprise a configurable constant that relates TQ in the optical domain to time measurements in the electrical network. The translation parameter(s) may also comprise data indicating measured constraints on the electrical connection, such as usable subcarriers, bit-loading limits, etc.

At step 517, the TQ based time grant measured at step 513 may be translated into an OFDM resource block grant across the electrical portion of the network in the time and frequency domains based on the profile/translation parameters. For example, a translation parameter may be equal to a ratio of OFDM symbol duration divided by TQ duration. A CNU may obtain a TQ duration value received in a gate message and divide the TQ value by the translation parameter to determine a percentage of an OFDM symbol duration that is allocated for the CNU (e.g. the time domain portion of the allocation). The CNU may also consult the profile to determine which subcarriers are allocated to the CNU during the TQ (e.g. the frequency domain portion of the allocation). For example, the profile may designate the frequency portion of the resource block(s) by indicating groups of subcarriers, where each group of subcarriers comprises the same bit loading capacity. As another example, the subcarriers may be grouped so that each frequency portion of a resource block comprises the same number of subcarriers, with potentially varying bit loading capacity between subcarriers and/or resource blocks. By correlating the time domain portion and the frequency domain portion, the CNU may determine the resource block allocated for a particular transmission. As another example, the subcarriers to be employed may be encoded in the gate message. In either case, the translation parameter may be used to correlate timing in the optical network to timing in the electrical network. The translation parameter may be made available cross all devices in the network.

At step 519, upstream data (e.g. as requested in step 511) may be transmitted by employing the resource block(s) obtained in step 517. When transmitting the data, profile pointers may be included to allow upstream devices to separate communications associated with different LLIDs and/or different CNUs communicating as part of the same transmission burst. Profile pointers may be designated for a specific CNU, such as a CNU physical layer (PHY) identifier (ID) or a CNU profile ID carried in a profile pointer and/or may be designated based on measured SNR or other measured conditions at the CNU. Profile pointers may also be selected based on resource block subcarrier modulation order, Forward Error Correction (FEC) scheme, Cyclic Prefix (CP), codeword length, and/or any value that describes the resource allocation for an OFDM symbol. The profile pointer(s) may be carried in a horizontal (e.g. time) or vertical (e.g. frequency) position within a resource block, may employ an entire subcarrier and/or symbol as long as the information carrier in the profile pointer can indicate the modulation order, FEC scheme, and can be used to separate transmissions between LLIDs and/or CNUs. Such pointers may be the same or different for each CNU and/or the same or different for each LLID associated with a CNU.

Figure 6:
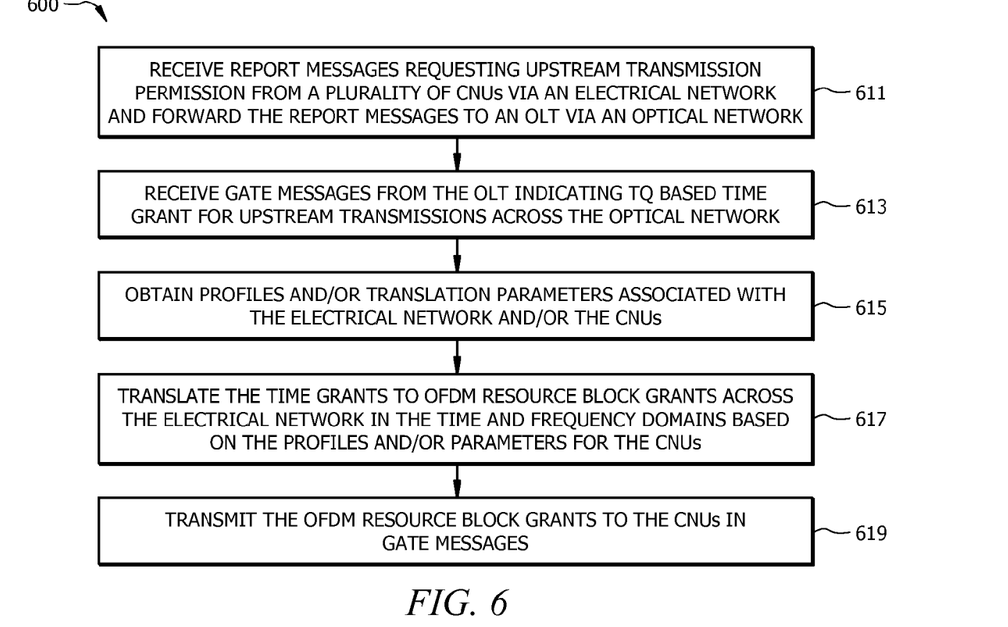
FIG. 6 is a flowchart of an embodiment of a method of TQ to OFDM translation in an electrical network by an FCU.

FIG. 6 is a flowchart of an embodiment of a method 600 of TQ to OFDM translation in an electrical network by an FCU, such as FCU 120. For example, method 600 may be employed in a two stage network, where the OLT (e.g. OLT 110) schedules time grants for transmissions from each FCU as a first stage and each FCU schedules grants for each CNU (e.g. CNU 130 and/or 230) based on the FCU grant. In such a network, the FCU may be responsible for managing OFDM scheduling in the electrical network to support the time based schedule in the optical network.

At step 611, a plurality of report messages may be received from a plurality of CNUs via an electrical network (e.g EDN 135). The report messages may each request upstream transmission permission for an associated CNU. The report messages may each be forwarded toward an OLT. In another embodiment, the report messages may be aggregated and a report message indicating the transmission requests of a plurality of CNUs may be forwarded to the OLT. At step 613, one or more gate messages may be received from the OLT indicating TQ based time grants for upstream transmissions across the optical network (e.g. ODN 115). At step 615, profiles and/or translation parameters may be obtained. The profiles and/or translation parameters may be associated with the electrical network and/or the CNUs. For example, the FCU may measure connectivity constraints for each CNU, assign profiles to each CNU accordingly, and/or receive such profiles from the OLT. The FCU may also obtain other translation parameters that may associate timing in the optical network with timing in the electrical network, as discussed above. At step 617, the optical domain TQ based time grants may be translated into OFDM resource block grants across the electrical network in the time and frequency domains. The translation may be based on the profiles and/or translation parameters associated with the electrical network and/or the CNUs as discussed above. At step 619, the OFDM resource block grants may be transmitted to the CNUs in gate messages.

Figure 7:
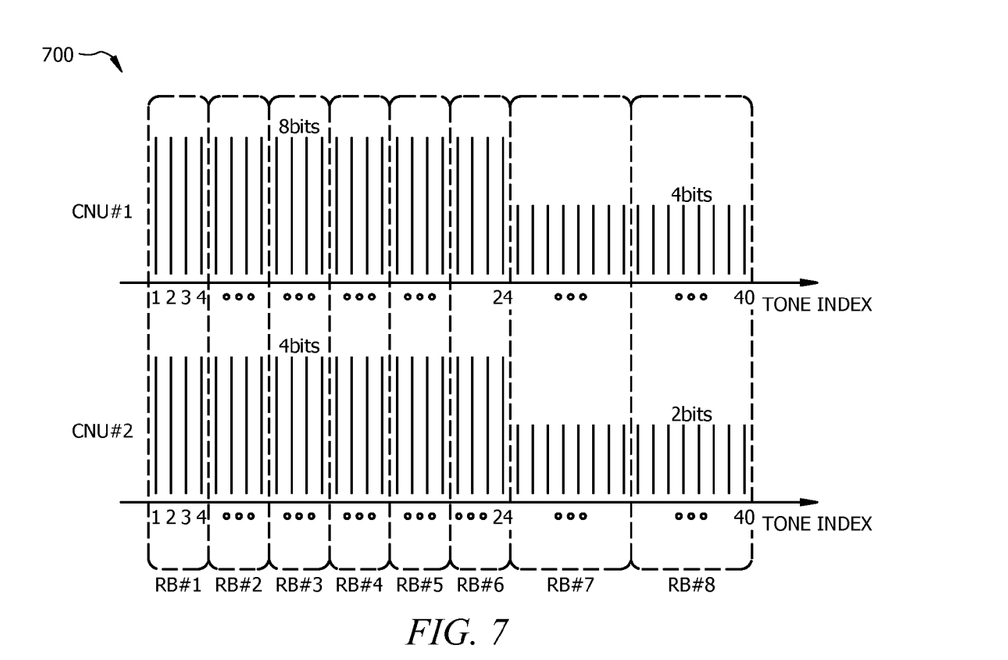
FIG. 7 is a schematic diagram of an embodiment of OFDM allocation by employing resource blocks with equivalent bit loading capacity.

FIG. 7 is a schematic diagram of an embodiment of OFDM allocation 700 by employing resource blocks with equivalent bit loading capacity. OFDM allocation 700 may comprise resource blocks (RBs) 1-8. OFDM allocation 700 may apply to an OFDM symbol with forty active subcarriers as indicated by a tone index extending along a horizontal axis. The active subcarriers may not include subcarriers in the frequency spectrum that are not employed for transmission. RBs 1-8 may be allocated so that each RB comprises the same bit loading capacity for a given CNU. In OFDM allocation 700, RBs 1-6 each comprise four subcarriers, with a bit loading capacity of eight bits per tone (for a CNU 1, such as a CNU 130 and/or 230), for a total bit loading capacity of thirty two bits per RB. RBs 7 and 8 may each comprise eight subcarriers. The subcarriers of RBs 7 and 8 may be of a modulation order with a lower bit loading capacity, in this case four bits per tone (for CNU 1). By employing eight subcarriers at four bits per tone, RBs 7 and 8 may comprise a bit loading capacity of thirty two bits per resource block, which may be substantially the same as RBs 1-6. As shown in OFDM allocation 700, the subcarriers may each have a lower bit loading capacity for CNU 2 (e.g. CNU 130 and/or 230), for example due to connectivity constraints specific to CNU 2, such as SNR. For purposes of clarity, the bit loading capacity for each tone with respect to CNU 2 may be half of the bit loading capacity of the same subcarriers for CNU 1. Each RB may comprise the same bit loading capacity as all other RBs, with respect to CNU 2. Accordingly, each RB may comprise a bit loading capacity of sixteen bits with respect to CNU 2. As such, each RB may be defined to have a constant bit loading value with respect to a specified CNU, but may have a different value between CNUs for reasons related to connectivity constraints. By employing allocation 700, each CNU may be assigned resource blocks that are appropriate to the CNU (e.g. variable bit loading capacity between CNUs) instead of assigning resource blocks to each CNU with a bit loading capacity based on the CNU with the worst connection.

It should be noted that the time dimension of OFDM allocation 700 may be held constant for each RB for clarity of discussion, for example for the duration of an OFDM symbol. Further, a specified CNU 1 may not have exactly double the bit loading capacity of a specified CNU 2 for all subcarriers. For example, a plurality of CNUs may have the same bit loading capacity for tone five, but a first CNU may have a bit loading capacity of eight for tone ten, while a second CNU may have a bit loading capacity of zero on tone ten due to local interference affecting tone ten at the second CNU. In any case, the entity allocating the resource blocks (e.g. OLT 110, FCU 120, and/or CNU 130) may account for such interference by defining resource blocks for each CNU based on measured conditions, such that all resource blocks comprise a constant bit loading capacity for a specified CNU.

Figure 8:
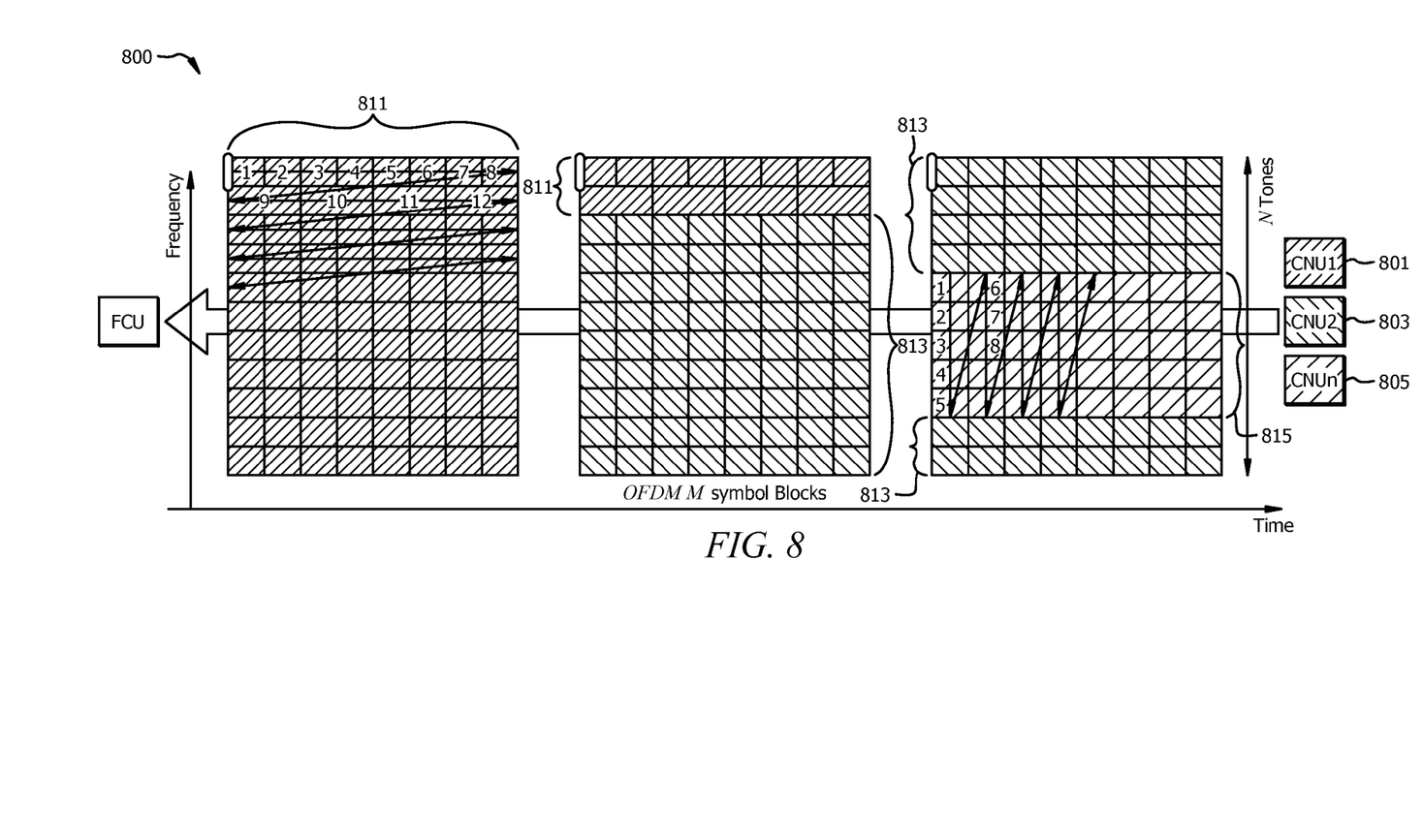
FIG. 8 is a schematic diagram of another embodiment of OFDM allocation by employing resource blocks with equivalent bit loading capacity.

FIG. 8 is a schematic diagram of another embodiment of OFDM allocation 800 by employing resource blocks with equivalent bit loading capacity. OFDM allocation 800 may be similar to OFDM allocation 700, but may also vary across the time domain. In allocation 800, a number of N active subcarriers (e.g. where N equals eleven) may be shown in the vertical axis (frequency domain) and number of OFDM symbol blocks may be shown in the horizontal axis (time domain). Allocation 800 may comprise a total of M OFDM symbols (e.g. where M equals three). The number of boxes per symbol may indicate the bit loading capacity for a specified tone with respect to a specified CNU. For example, some subcarriers may comprise four boxes (e.g. bit loading capacity of four) for a symbol/CNU, while other subcarriers may comprise eight boxes (e.g. bit loading capacity of eight) for a specified symbol/CNU. Allocation 800 may be made between CNU 801, CNU 803, and CNU 805, each of which may be substantially similar to CNUs 130 and/or 230. It should be noted that additional CNUs may also be employed and that only three CNUs are shown for purposes of clarity. In OFDM allocation 800, a plurality of resource blocks 811 may be allocated to CNU 801 in OFDM symbol one and two, a plurality of resource blocks 813 may be allocated to CNU 803 in OFDM symbols two and three, and a plurality of resource blocks 815 may be allocated to CNU 805 in OFDM symbol three.

Allocation 800 may be made based on a TQ value from an OLT. A measured TQ may comprise a value K, where K is a power of two (e.g. 16 nanoseconds (ns)). The M×N resources (e.g. total number of boxes) in an upstream transmission burst may be equally divided by K, which may result in resource block groups each having a common bit-loading capacity. As such, the total bit loading capacity of a resource block may be determined by the equation $RB_{bc}=M\times N_{bc}/K$, where K may be a power of two, $RB_{bc}$ may be the bit-loading capacity of the resource blocks, and $M\times N_{bc}$ may be the bit-loading capacity of the resources available in the transmission burst. The resource blocks may then be assigned to each CNU based on the amount of data the CNU requests for upstream transmission. As shown in allocation 800, each CNU may map data to allocated resource blocks by employing a local mapping. For example, CNU 801 may map data into boxes along the horizontal axis (time domain) until a tone of a symbol reaches capacity before moving to the next tone. As another example, CNU 805 may map data to each tone in the vertical axis (frequency domain) until all subcarriers are employed before moving to the next time portion of the symbol. By employing allocation 800, a translating entity may determine a resource block allocation across the electrical domain based on the TQ received from an OLT.

Figure 9:
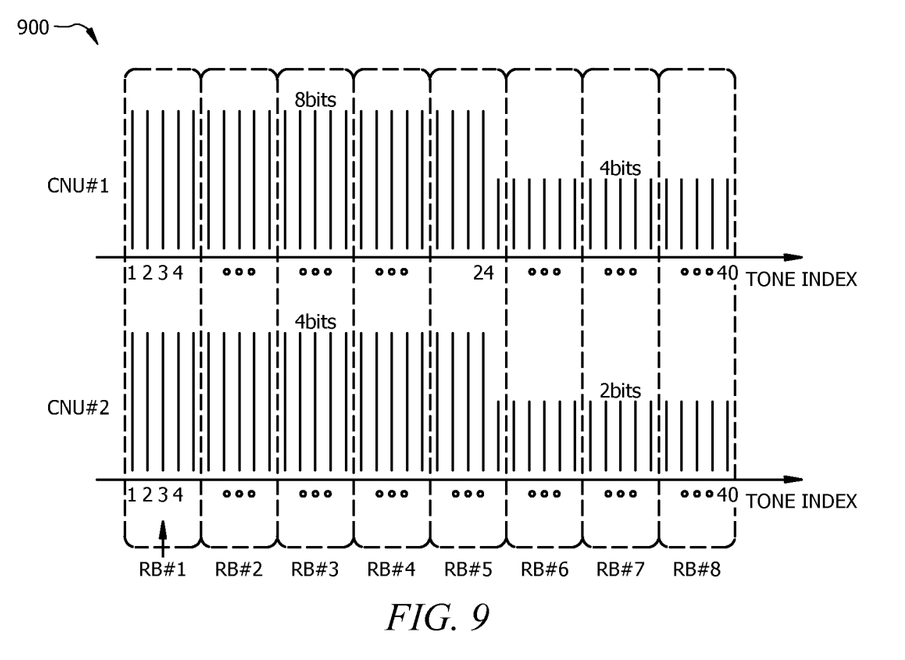
FIG. 9 is a schematic diagram of an embodiment of OFDM allocation by employing resource blocks with an equivalent number of subcarriers.

FIG. 9 is a schematic diagram of an embodiment of OFDM allocation 900 by employing resource blocks with an equivalent number of subcarriers. Allocation 900 may be similar to allocation 700, but may employ a constant number of subcarriers per resource block. For example, RBs 1-8 may each comprise five subcarriers regardless of bit loading capacity. In OFDM allocation 900, with respect to CNU 1, RBs 1-4 may have a bit loading capacity of forty (five subcarriers of eight bits each), RB 5 may have a bit loading capacity of thirty six (four subcarriers of eight bits and one tone of four bits), and RBs 6-8 may have a bit loading capacity of twenty (five subcarriers of four bits each). With respect to CNU 2, RBs 1-4 may have a bit loading capacity of twenty (five subcarriers of four bits each), RB 5 may have a bit loading capacity of eighteen (four subcarriers of four bits and one tone of two bits), and RBs 6-8 may have a bit loading capacity of ten (five subcarriers of two bits each). By holding tone number constant per resource block, the resource blocks may be allocated based on the number of active subcarriers available instead of based on data carrying capacity.

Figure 10:
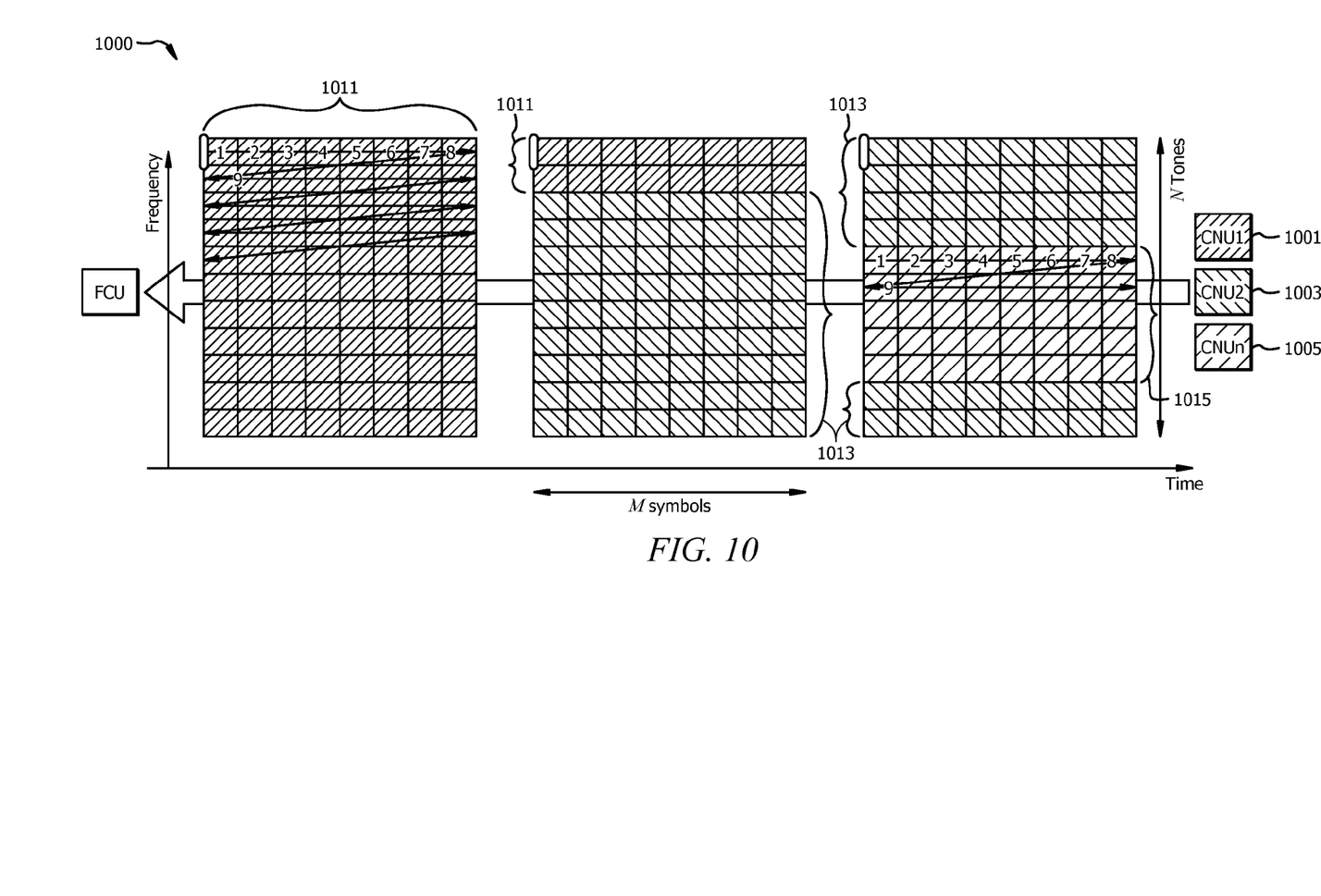
FIG. 10 is a schematic diagram of another embodiment of OFDM allocation by employing resource blocks with an equivalent number of subcarriers.

FIG. 10 is a schematic diagram of another embodiment of OFDM allocation 1000 by employing resource blocks with an equivalent number of subcarriers. Allocation 1000 may be similar to allocation 800, but may hold the number of subcarriers constant per resource block. For example, CNUs 1001, 1003, and 1005 may be substantially similar to CNUs 801, 803, and 805, respectively, and may be assigned a plurality of resource blocks 1011, 1013, and 1015, respectively. As in allocation 800, allocation 1000 may comprise M×N resources (M symbols with N subcarriers) that correspond to K TQs. However, allocation 1000 may be completed by dividing the total resources by a constant number of subcarriers instead of calculating based on bit-loading capacity. In allocation 1000, $RB_T=M_T/K$, where $RB_T$ may be the number of subcarriers per resource block, $M_T$ may be the number subcarriers in the M symbols, and K may be the number of TQ allocated for the transmission in the optical domain. By employing allocation 1000, a translating entity may determine a resource block allocation across the electrical domain based on the TQ received from an OLT.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A Coaxial Network Unit (CNU) comprising:
   a transmitter configured to transmit an Ethernet Passive Optical Network (EPON) report message toward an Optical Line Terminal (OLT) via a coaxial network and an optical network, wherein the EPON report message requests an upstream transmission time grant to transmit a specified amount of data;
   a receiver configured to receive an EPON gate message comprising Time Quanta (TQ) information indicating an upstream transmission time grant across the optical network; and
   a processor coupled to the receiver and the transmitter and configured to:
   obtain a resource profile indicating upstream frequency parameters associated with the coaxial network;
   translate the TQ information and the resource profile into one or more Orthogonal Frequency-Division Multiplexing (OFDM) resource blocks, wherein each OFDM resource block indicates an upstream OFDM resource allocation in a time domain and in a frequency domain across the coaxial network; and
   schedule an upstream transmission by employing the OFDM resource blocks translated from the TQ information and the resource profile,
   wherein all subcarriers in any OFDM resource block employ a common Quadrature Amplitude Modulation (QAM) constellation, and wherein subcarriers in a first of the OFDM resource blocks employs different QAM constellations than subcarriers in a second of the OFDM resource blocks.

2. The GNU of claim 1, wherein each OFDM resource block comprises a common bit loading capacity with all other OFDM resource blocks.

3. The CNU of claim 1, wherein a first of the OFDM resource blocks comprises a first bit loading capacity, wherein a second of the OFDM resource blocks comprises a second bit loading capacity, and wherein the bit loading capacity of the first OFDM resource block is different from the bit loading capacity of the second OFDM resource block.

4. The GNU of claim 1, wherein each OFDM resource block comprises a common number of active subcarriers as all other OFDM resource blocks.

5. The GNU of claim 1, wherein the TQ information is expressed in units configured for the optical network, wherein the EPON gate message further comprises a configurable constant that indicates a relationship between the optical network TQ information and time units in the coaxial network, and wherein processor employs the configurable constant to translate the TQ information and the resource profile into the OFDM resource blocks.

6. The GNU of claim 1, wherein the resource profile is based on the amount of data requested in the EPON report message.

7. The CNU of claim 1, wherein the resource profile indicates a plurality of profile pointers, and wherein the CNU is configured to:

transmit at least some of the data in an upstream OFDM symbol using time and frequency resources specified in the OFDM resource blocks; and insert the profile pointers in the upstream OFDM symbol to separate the OFDM resource blocks.

8. A method implemented in a Coaxial Line terminal (CLT) comprising:

receiving a plurality of an Ethernet Passive Optical Network (EPON) report messages from a plurality of Coaxial Network Units (CNUs) across a coaxial network;

receiving an EPON gate message comprising Time Quanta (TQ) information indicating an upstream transmission time grant for the CLT across an optical network;

translating TQ based upstream transmission time grants to Orthogonal Frequency-Division Multiplexing (OFDM) resource block grants in a time domain and in a frequency domain across the coaxial network for each CNU based on the configurable constants; and transmitting an EPON over Coaxial (EPoC) gate message to each CNU, wherein each EPoC gate message comprises a CNU profile indicating the OFDM resource block grants for an associated CNU and a start time, wherein the OFDM resource blocks are selected to allow a plurality of the CNUs to perform upstream transmission by employing a common OFDM symbol in different frequencies.

9. The method of claim 8, wherein each OFDM resource block grant comprises a common bit loading capacity with all other OFDM resource block grants.

10. The method of claim 8, wherein each OFDM resource block grant comprises a common number of active subcarriers as all other resource block grants.

11. The method of claim 8, wherein all subcarriers in any OFDM resource block employ a common Quadrature Amplitude Modulation (QAM) constellation, and wherein subcarriers in a first of the OFDM resource blocks employs different QAM constellations than subcarriers in a second of the OFDM resource blocks.

12. The method of claim 8, wherein translating the TQ based upstream transmission time grants to OFDM resource block grants comprises employing an FEC (Forward Error Correction) coding scheme for upstream transmissions based on pay load data sizes requested in the EPON report messages.

13. A method comprising:

receiving, by an Optical Line Terminal (OLT), a plurality of Ethernet Passive Optical Network (EPON) report messages from a plurality of Coaxial Network Units (CNUs) via an electro-optical network, wherein the EPON report messages request upstream transmission grants;

allocating at least one Orthogonal Frequency-Division Multiplexing (OFDM) resource block to each CNU for upstream transmission, wherein each resource block comprises allocated upstream OFDM resources in a time domain and in a frequency domain across a coaxial portion of the electro-optical network; and transmitting EPON gate messages across the electro-optical network to indicate the resource block allocations for the CNUs, wherein the resource blocks are allocated based on profiles associated with each CNU, and wherein the profiles indicate bit loading capacities associated with each CNU.

14. The method of claim 13, wherein each OFDM resource block comprises a plurality of subcarriers, and wherein all resource blocks comprise a common number of subcarriers.

15. The method of claim 13, wherein each OFDM resource block comprises a bit loading capacity, and wherein all resource blocks comprise a common bit loading capacity.

16. The method of claim 13, wherein at least one of the EPON gate messages instructs an associated CNU to insert a profile pointer in an upstream transmission associated with a first Logical Link Identifier (LLID) to separate a first LLID upstream transmission from upstream transmissions associated with a second LLID.

17. The method of claim 13, wherein each OFDM resource block comprises a plurality of subcarriers, and wherein all active subcarriers in a specified resource block comprise a common modulation order.

* * * * *